United States Patent [19]

Catlett

[11] 4,175,352
[45] Nov. 27, 1979

[54] SPRING POWERED, PORTABLE, HAND HELD SUCTION AND BLOWER APPARATUS

[76] Inventor: Richard E. Catlett, 1011 S. Peabody St., Port Angeles, Wash. 98362

[21] Appl. No.: 847,132

[22] Filed: Oct. 31, 1977

[51] Int. Cl.² .................... A01M 1/06; A47L 5/24
[52] U.S. Cl. ............................. 43/139; 15/330; 15/344
[58] Field of Search .............. 43/135, 138, 139, 140, 43/141; 15/341, 342, 343, 344, 330

[56] References Cited

U.S. PATENT DOCUMENTS

| | | | |
|---|---|---|---|
| 879,580 | 2/1908 | Pearsall | 15/342 |
| 970,181 | 9/1910 | Carter | 43/139 |
| 1,298,716 | 4/1919 | Hoover | 15/343 X |
| 1,313,203 | 8/1919 | Pakeman | 43/139 |
| 2,340,944 | 2/1944 | Easter | 43/139 |
| 3,477,087 | 11/1969 | Robinson | 15/344 |
| 3,513,500 | 5/1970 | Hori | 15/344 |
| 3,599,273 | 8/1971 | Shirayanagi | 15/344 |
| 3,683,446 | 8/1972 | Tell | 15/330 |
| 4,055,870 | 11/1977 | Furutsutsumi | 15/330 |
| 4,074,458 | 2/1978 | Catlett | 43/139 |

Primary Examiner—Nicholas P. Godici
Attorney, Agent, or Firm—Graybeal & Uhlir

[57] ABSTRACT

A portable, hand held, air suction and blower unit comprising an air inlet assembly with sequentially arranged nozzle, flexible inlet tube, and diffuser, all detachably connected to the front end of the unit body. The diffuser cooperates with the front end of the body to form a bayonet type joint therebetween. An air inlet passage extends rearwardly from the front end of the body to the tangential fan which is journaled at the rear of the body. The fan is powered by a manually wound flat spiral spring, which spring drives the fan through a gear train. An air outlet passage extends forwardly from the fan to an outlet opening also located at the front of the unit body. A removable, pervious receptacle, with an open forward end, is located in the front portion of the air inlet passage and serves to collect particles or objects which are drawn into the body by the flowing air. Furthermore, a flap valve, which is located in the diffuser, allows the particles or objects to pass by and enter into the receptacle when air is being drawn into the body by the fan. The flaps of the valve, however, relax to close off the receptacle from the nozzle when the fan is not operating.

5 Claims, 12 Drawing Figures

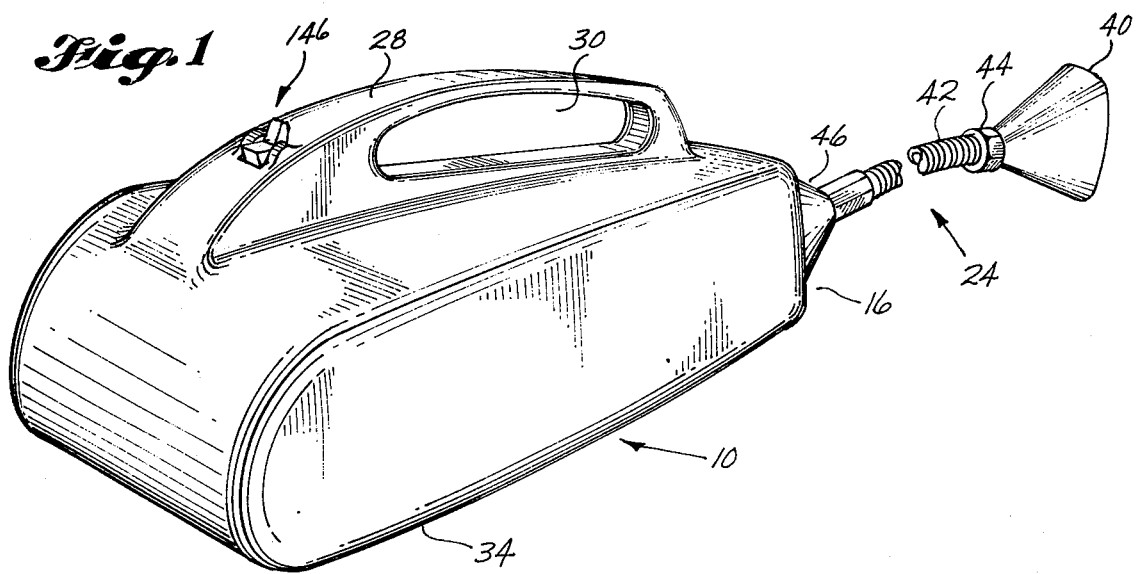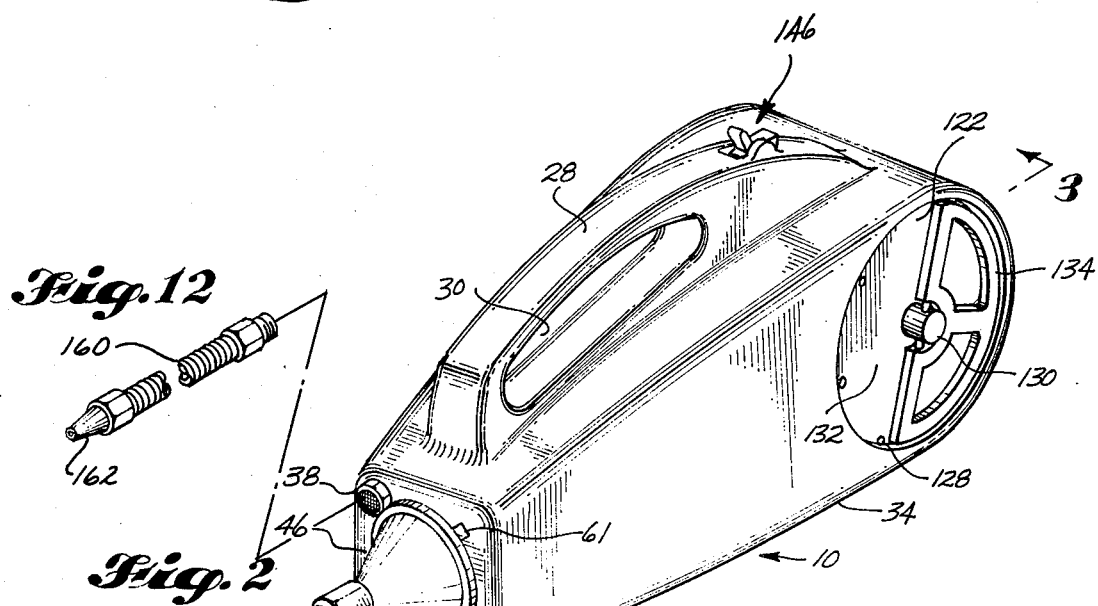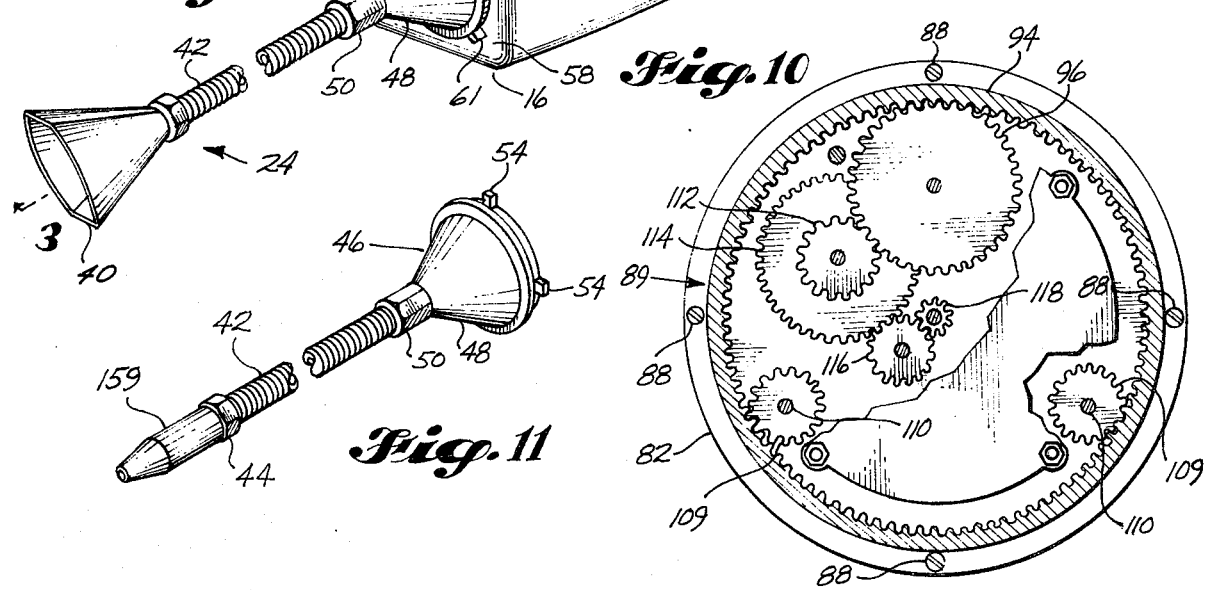

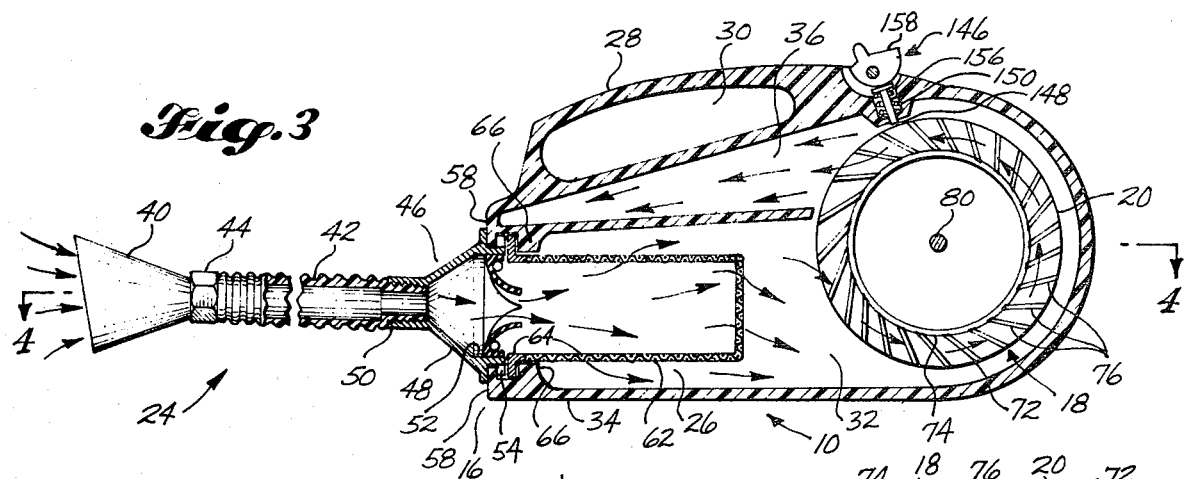
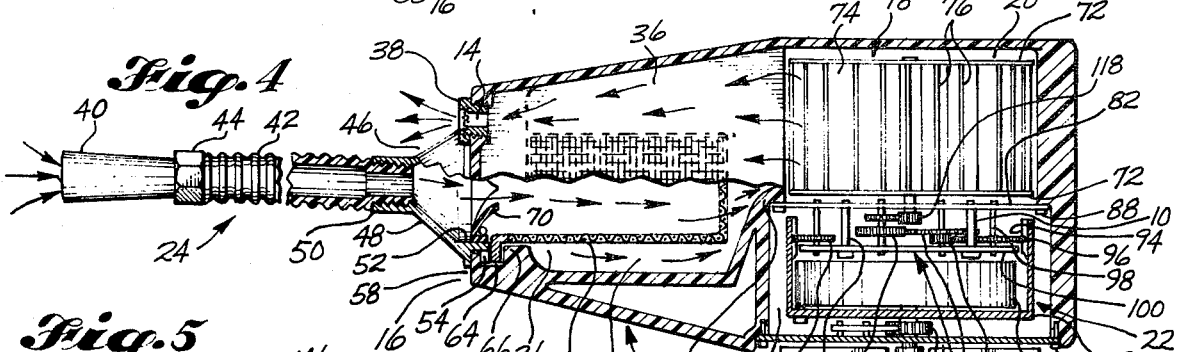
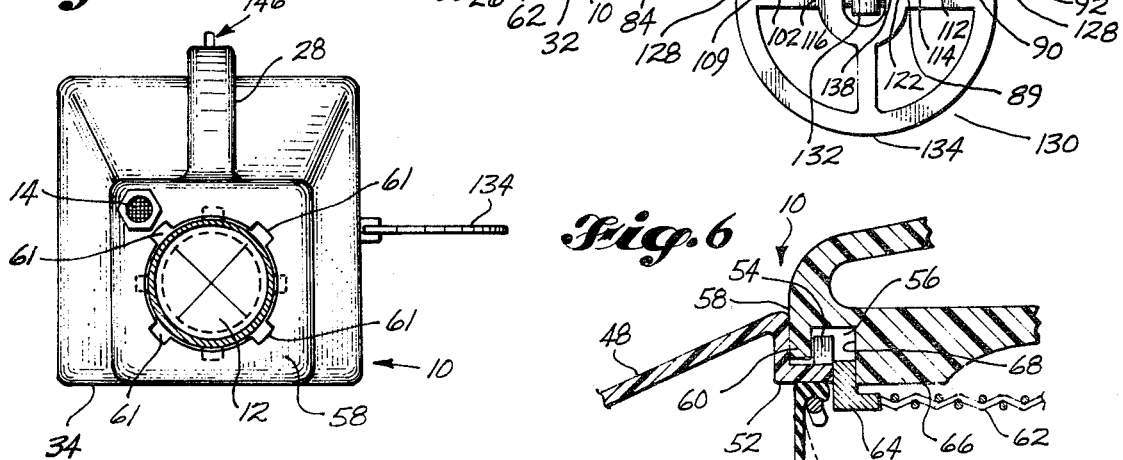
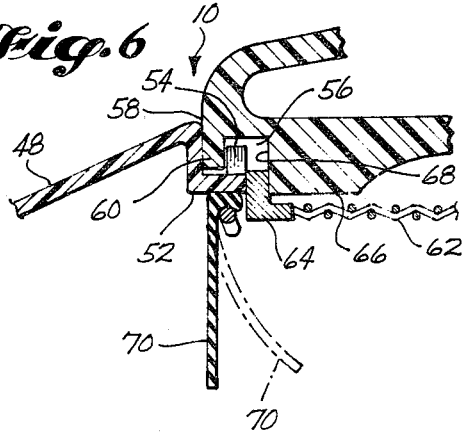

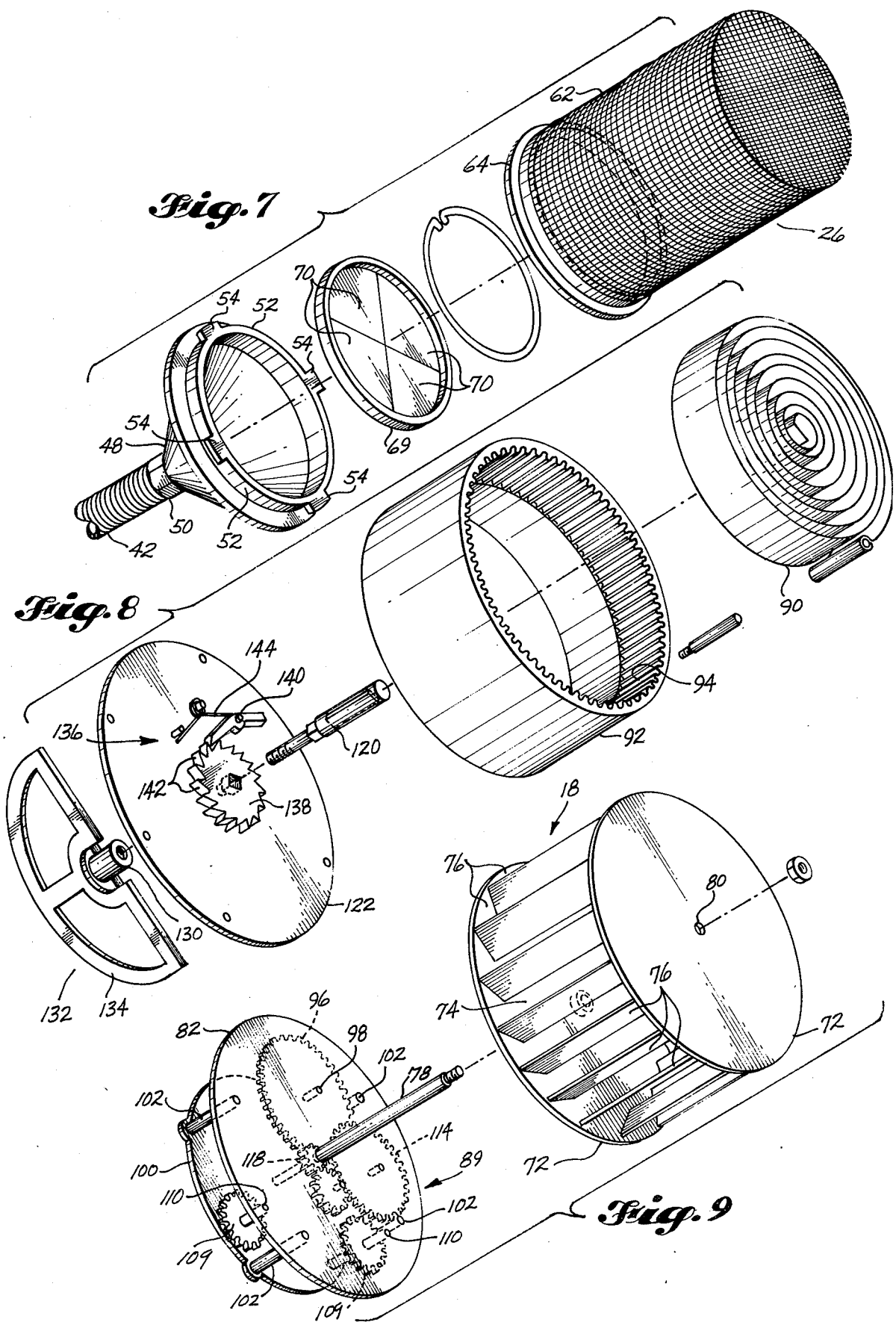

SPRING POWERED, PORTABLE, HAND HELD SUCTION AND BLOWER APPARATUS

BACKGROUND OF THE INVENTION

1. Field of the Invention

The present invention relates to an air suction and blower apparatus, and more particularly to a portable, hand held, manually energized apparatus for trapping insects.

2. Description of the Prior Art

Insects have been generally controlled by the use of chemical insecticides, which insecticides were commonly applied either by spraying or dusting. However, due to the increased awareness of the harmful effects to the environment caused by the use of insecticides, many of them have been banned from general consumer use by the Federal Government. Thus, alternative methods and devices for controlling insects, which do not involve the use of dangerous chemicals, are being increasingly sought.

One known type of device for controlling insects employs flowing air to trap insects. These insect traps generally consist of a body; suction means for drawing air, and thus insects, into the body; and a container for collecting the insects. An expedient conforming to this general description is a stationary type insect trap, which trap being stationary, requires additional means to attract insects, such as a light source as disclosed in Shinner, U.S. Pat. No. 2,040,276, in Cornell, U.S. Pat. No. 3,305,965, and in Plunkett, U.S. Pat. No. 3,196,577; a noise source as disclosed in Sweet U.S. Pat. No. 1,807,076; and an odoriferous substance as also disclosed by Plunkett U.S. Pat. No. 3,196,577. Ordinarily, the suction means for stationary insect traps comprise a fan powered by an electric motor, which fan is usually located between the insect attracting means and the container. A disadvantage of stationary type insect traps is that they are often expensive and complicated, especially since they require additional means for attracting the insects. A second disadvantage is that they are usually cumbersome and cannot be moved readily from one location to another. Thirdly, in terms of the electrical energy used by the fan motor, these devices are wasteful, as they must be operated whether or not insects happen to be present.

Another well-known device is the portable type insect trap, which can be carried by the operator to locations where insects are known to exist. In addition to the general structure described above, portable insect traps usually includes an intake barrel or nozzle which can be pointed at the particular insects which are to be exterminated. One common type of portable insect trap is disclosed in Easter U.S. Pat. No. 2,304,944, in which a fan is used as an air suction device. The fan is powered by an electric motor running on household current. The obvious disadvantage of this type of portable insect trap is that it can only be used at locations where electrical power outlets are available.

A second known kind of portable insect trap also incorporates a fan powered by an electric motor; however, batteries are provided as the energy source for the fan motor. My own U.S. Pat. No. 4,074,458, filed on Feb. 23, 1976 as Ser. No. 660,711, discloses such a device, as does Arther U.S. Pat. No. 3,214,861. While this particular type of insect trap has the advantage of being more portable than the type previously described, it has the disadvantage of a limited volumetric air flow capacity. For this particular type of trap to remain portable, the batteries cannot be too bulky or heavy to make carrying this device cumbersome or difficult. Thus, the batteries which are commonly employed are not large enough to power a sufficiently sized fan at a high enough speed to generate a satisfactory air flow rate over long periods. Another limitation of this particular type of insect trap is that if it is to be used in a remote location, spare batteries must be brought along, thus increasing the weight of the load carried by the operator.

A third kind of known portable insect trap incorporates a manually operated or energized air suction source. One such mechanism, as shown in Dexter U.S. Pat. No. 454,720, and shown in Cox U.S. Pat. No. 1,141,039, includes a body in the form of an elongated cylinder, and a piston, driven by a compression spring, housed therein. When the compression spring is compressed and then released, the piston is pulled along the length of the cylinder to cause air and thus insects to be drawn into the cylinder. A disadvantage of this air suction source is that it does not operate continuously, and furthermore, must be cocked before each firing.

A second type of known portable insect trap utilizing a manually energized air suction source is disclosed by Lauen U.S. Pat. No. 1,289,825 as including a fan geared to a handle, which handle must be manually turned to create an air flow. The disadvantage of this apparatus is that it is difficult for the operator to turn the fan fast enough to create an adequate velocity of air flow. Alternatively, if a larger fan is utilized in an attempt to increase the air flow velocity rate, the overall size of the apparatus becomes larger and thus more cumbersome. The insect trap in Lauen is so large that it must be provided with a shoulder strap so an operator can carry it.

A third type of portable insect type having a manually energized air suction source utilizes a compression or flat spiral spring to turn a conventional fan. An example of such a device is disclosed in Carter U.S. Pat. No. 970,181, which device has the limitation of being rather cumbersome. Furthermore, because the fan is located between the inlet nozzle and the container, the insects are chopped by the fan with parts of the insects' bodies being deposited on the fan blade. This necessitates the time-consuming procedure of periodically having to disassemble the mechanism and manually clean the fan blade.

Also notable as being of general interest in the field of suction and blower apparatus are the following: Keiser U.S. Pat. No. 2,992,770, E. M. Sugarman U.S. Pat. No. 3,231,997, N. H. Thybault U.S. Pat. No. 3,750,327, and D. L. Nupp U.S. Pat. No. 3,758,914.

SUMMARY OF THE INVENTION

The instant invention relates to a novel, portable, hand held, air suction and blower apparatus, in basic form, composed of a body having a front end portion in which is located forwardly directed air inlet and outlet openings. The body also has a rear end portion in which is journaled a fan for drawing air into the body through the inlet opening and then blowing the air out of the body through the outlet opening. The fan is powered by a manually energized spring motor in the form of a flat spiral spring, which spring motor is geared to the fan. Before air reaches the body inlet opening, it first must pass through air inlet means, which air inlet means, in air flow sequence, is comprised of a nozzle, a flexible inlet tube connected to the rear end of the nozzle, and a diffuser detachably connected to both the rear end of the inlet tube and the body front end portion. The diffuser rear end portion and the body front end portion are structured to form a bayonet type joint therebetween, permitting rapid removal of the air inlet means so that a pervious receptacle, which is insertable into the body through the body air inlet opening, can be conveniently removed. The receptacle, which has an open end directed toward the air inlet means, is disposed between the air inlet means and the fan. This receptacle serves to collect objects, such as insects or dirt, that are carried by the air entering the body.

It is an object of the present invention to provide an apparatus which can conveniently be used either as a hand manipulated air suction device or air blower device.

Another object of the present invention is to provide a self-powered, portable, lightweight, hand held, air suction and blower apparatus.

A further object of this invention is to provide an air suction and blower apparatus which can be manually energized, thus resulting in a very low operating cost.

Still another object of this invention is to provide an air suction apparatus which can be used to actively pursue and draw insects into the apparatus to either collect them unharmed or to exterminate them.

An additional object of the present invention is to provide an air suction apparatus for trapping insects which is convenient to operate.

Yet another object of this invention is to provide an air suction apparatus for collecting insects, from which the trapped insects can be rapidly and easily removed.

BRIEF DESCRIPTION OF THE DRAWINGS

FIG. 1 is a rear isometric view of an embodiment of the air suction and blower apparatus of the present invention shown assembled to be used as a suction device;

FIG. 2 is a front isometric view of the air suction and blower apparatus shown in FIG. 1;

FIG. 3 is a partial cross section of the air suction and blower apparatus shown in FIG. 2 taken substantially along the lines 3—3 thereof;

FIG. 4 is a partial cross sectional view of the air suction and blower apparatus shown in FIG. 3, taken substantially along lines 4—4 thereof;

FIG. 5 is a front elevational view of the air suction and blower apparatus shown with the air inlet means removed from the body;

FIG. 6 is a partial enlargement of the cross sectional view of the air suction and blower apparatus shown in FIG. 3, illustrating the bayonet joint formed by the diffuser and the body;

FIG. 7 is an exploded isometric view illustrating the construction of the diffuser and the flap valve;

FIG. 8 is an exploded isometric view showing the construction of the spring motor;

FIG. 9 is an exploded isometric view illustrating the fan and the gear train;

FIG. 10 is an elevational view of the gear train shown in FIG. 9;

FIG. 11 is a isometric view of an alternative embodiment of the air inlet means shown in FIG. 2; and FIG. 12 is a isometric view of a nozzle and outlet tube assembly to be used when the apparatus of FIG. 2 is used as a blower.

DESCRIPTION OF THE PREFERRED EMBODIMENT

Referring initially to FIGS. 1 and 2, shown in isometric views is a typical air suction and blower apparatus constructed according to the instant invention. In preferred form, it comprises a body 10 having a forwardly directed air inlet opening 12 and outlet opening 14 located in the front end portion 16 of said housing. Air is drawn into body 10 through inlet opening 12 and then is blown out of said body through outlet opening 14 by fan 18, which fan, as depicted in FIGS. 3 and 4, is journaled in fan housing 20, located at the rear end portion of body 10, and is powered by a manually wound spring motor 22. Prior to entering body 10 the air must first flow through air inlet means 24, which means is detachably connected to front end portion 16 to direct such air to air inlet opening 12. A pervious receptacle 26 is is disposed between air inlet means 24 and fan 18 to collect insects, dust or other particles which are drawn into housing 10 by said fan.

Now referring specifically to FIGS. 1 and 2, body 10 is depicted as an elongated, forwardly tapered member having a substantially rectangular cross section. An integral handle 28 is disposed above body 10 and extends laterally centrally along the length thereof. Said handle intersects the top surface of body 10 to define opening 30 therewith, which is of a size sufficient to receive the hand of an operator, thus enabling said handle to be easily grasped. Almost the entire front end of body 10, as shown in FIGS. 2-5, is occupied by circular air inlet opening 12, which air inlet opening defines the forward end of internal air inlet passage 32. Said inlet passage extends from air inlet opening 12, rearwardly along the length of and adjacent to the bottom wall 34 of body 10 to intersect fan housing 20. A forwardly tapered, internal outlet passage 36, note FIGS. 3 and 4, begins at fan housing 20 and terminates at threaded, circular air outlet opening 14, which outlet opening, when viewed from the direction facing said body front end portion 16, is located in the upper left hand quadrant of the margin of inlet opening 12. A screened nut 38 is provided with male threads to permit said nut to be screwed into outlet opening 14 for preventing particles which are drawn into body 10 from being blown out of said body when the present apparatus is used as an air suction device. Desirably, nut 38 also fits the female threads of end portion 50 of body portion 48, when the unit is used as a blower.

Air inlet means 24, as best shown in FIGS. 2-4, includes nozzle 40, which nozzle has a rectangular shaped forward end and a cylindrical shaped rearward end portion having external, male threads. An elongated flexible inlet tube 42 has an internally threaded forward end portion in the form of hex nut 44 for receiving the threaded rearward end of nozzle 40. At the rear end portion of inlet tube 42 are male threads of the same size as the male threads of nozzle 40 and threaded nut 38. Said inlet tube being flexible, allows the operator to point nozzle 40 in any selected direction. A diffuser 46 is disposed between inlet tube 42 and body 10. Said diffuser has a main body portion 48 in the form of a hollow, right, truncated cone, and a forward end portion 50 in the form of a hexagonal shape nut, which nut has internal female threads for receiving the male threaded end of inlet tube 42, and threaded screened nut 38, when the unit is used as a blower. It is to be understood that nozzle 40 and diffuser 46 can be of many other shapes. Furthermore, rather than having their forward end portions in the form of hexagonal nuts, inlet tube 42 and diffuser 46 can have forward ends of other shapes, such as square. Alternatively, said forward end sections can be eliminated and the female threads, which are located in said forward end sections, can be provided in inlet tube 42 and in diffuser main body portion 48 themselves.

The end portion of diffuser 46 opposite inlet tube 42 cooperates with housing front end portion 16 to form a bayonet type joint therebetween. To produce this joint, as best shown in FIGS. 6 and 7, diffuser 46 includes a shoulder portion 52 which is concentric with and extends rearward from the end of diffuser main body portion 48. Shoulder portion 52 has an outside diameter which is smaller than the adjacent diameter of said diffuser main body portion. Four equally spaced lugs 54 extend radially outward from and are flush with the end of shoulder portion 52 opposite diffuser main body portion 48. The outer edge of lugs 54 define a circle concentric with shoulder portion 52. An internal groove 56, FIG. 6, of substantially rectangular cross section and of a diameter slightly larger than the circle defined by lugs 54, is located in front end portion 16 of body 10. Said groove is spaced slightly rearwardly of body front face 58 and is concentric with air inlet opening 12. Groove 56 has a forward side wall 60, the edge of which defines circular air inlet opening 12. Said opening has a diameter greater than the diameter of shoulder portion 52 but less than the diameter of the circle defined by the outer edges of lugs 54. As best shown in FIG. 5, portions of wall 60 are cut away to form four slots 61 which are in registry with lugs 54, thus enabling said lugs to slidably pass through said slots and into groove 56. Diffuser 46 can thus be simply twisted slightly to lock air inlet means 24 with body 10.

Receptacle 26 is best shown in FIGS. 3, 4 and 7, has a pervious, cylindrical container portion 62 which is closed at one end, and an annular shaped flange 64 extending radially outwardly from the open end of container portion 62 to encircle said container portion. The outside diameter of said flange 64 is smaller than the diameter of groove forward side wall 60 to enable receptacle 26 to pass through inlet opening 12 and into inlet passage 32, to thus locate said receptacle between air inlet means 24 and fan 18. As best shown in FIGS. 3 and 6, housing inlet passage 32 has a bore portion 66 which closely encircles container portion 62 of receptacle 26 to thereby pilot and radially locate receptacle 26 in respect to said inlet passage. When receptable 26 is inserted into body 10 and diffuser 46 is in locked engagement with body front end portion 16, flange 64 of receptacle 26, as best shown in FIGS. 3, 4 and 6, is sandwiched between the adjacent end of diffuser shoulder portion 52 and side wall 68 of internal groove 56 to form an airtight joint therebetween. As will be understood, container portion 62 of receptacle 26 can be made from paper or cloth if dust is being collected, or of plastic or metal if larger objects, such as insects, are being collected.

The structure of receptacle 26 as thus described, plus the bayonet joint formed by the cooperation between diffuser 46 and body front end portion 16, enables a user to quickly and conveniently remove said receptacle from body 10 and replace it with another such receptacle or with the emptied original receptacle. Furthermore, because receptacle 26 is located between air inlet opening 12 and fan 18, rather than between fan 18 and air outlet opening 14, insects which are being trapped will not be mutilated by the rotating fan. Therefore, not only can the present invention be used to collect insects unharmed, it also does not require the time-consuming, manual operation of dismantling the apparatus to remove chopped up portions of insects from fan 18.

To retain collected matter within receptacle 26 and, more specifically, to prevent trapped insects from escaping, a flap valve 69 is located in the circular passage defined by shoulder portion 52 of diffuser 46. Said valve is constructed from a single piece of circular flexible material in which two cuts are made at right angles to each other to divide said material into four segments or flaps 70. Flaps 70 are flexible enough to deflect under the influence of the flowing air being drawn into body 10; however, said flaps have adequate structural integrity to close off the passage in diffuser 46 when no air is flowing.

Referring specifically to FIGS. 3 and 4, tangential fan 18 is shown as journaled in housing 20 of body 10 to rotate about an axis perpendicular to the length of air inlet and outlet passages 32 and 36, respectively. Such tangential fan is constructed of parallel, circular side plates 72 spanned by cylinder 74. Radially extending fan blades 76 are positioned around the perimeter of said plates 72, which fan blades, being of the same length as fan cylinder 74, abut the inside surfaces of side plates 72 and also contact the outer surface of fan cylinder 74. Fan blades 76 are canted forwardly in the direction of rotation of fan 18 to effectively draw air into body 10 through inlet opening 12 and then forcefully expel air from said housing through outlet opening 14. Fan 18 is rotated by shaft 78, which shaft extends through aligned holes 80 located centrally in each fan side plate 72. Said fan shaft is illustrated in FIG. 4 as journaled at one end in the adjacent wall of body 10 and at the other end in circular, gear train mounting plate 82. Said plate 82 is attached to shoulder 84 of bore 86 by conventional fasteners such as screws 88 extending through clearance holes provided in said gear train mounting plate and extending into corresponding tapped holes located in said shoulder.

Spring motor 22, as depicted most clearly in FIG. 4, is housed in bore 86 to abut fan 18. Said spring motor turns about an axis aligned with the axis of rotation of fan 18 and comprises a flat spiral spring 90 encased in a barrel 92. Said spiral spring 90, when wound, rotates fan 18 through gear train 89; the exterior end of said spiral spring being fixedly attached to the interior surface of said barrel, and rotating said barrel. The end portion of barrel 92 which is shown in FIG. 4 as extending beyond spiral spring 90, includes an integral internal gear 94. Said internal gear is meshed with a second gear 96, which second gear is supported for rotation by shaft 98. Shaft 98 is journaled at one end in gear train mounting plate 82 and at the opposite end in circular, gear train support plate 100. Said support plate is dependently connected in spaced parallel relationship to gear train mounting plate 82 by spacer pins 102, each of said pins having a major diameter central portion and minor diameter end portions. Said spacer pin end portions extend through aligned holes provided in gear train mounting plate 82 and gear train support plate 100, with the annular end surfaces of the central portion of spacer pins 102 bearing against abutting surfaces of said gear train mounting plate and said gear train support plate. To maintain internal gear 94 meshed with second gear 96, gear train 89 further includes two idler gears 109, which also engage with said internal gear 94. Idler gears 109 are supported for rotation by shafts 110, which shafts are journaled at one end in gear train mounting plate 82 and at the other end in gear train support plate 100. Second gear 96 drives a smaller third gear 112, FIGS. 4 and 10, which third gear is mounted on a common shaft with a larger fourth gear 114 in a manner analogous to that of second gear 96. Fourth gear 114 then turns, at a stepped up speed, a smaller fifth gear 116, which fifth gear is also supported in the same manner as the previously described gears. Fifth gear 116 in turn powers drive gear 118 and thus fan 18, through fan shaft 78. It can be appreciated that gear train 89 serves to rotate fan 18 at a much faster speed than that at which internal gear 94 is rotating. This will ensure that a sufficient air flow velocity is generated by said fan. Furthermore, it is preferable that the components of gear train 89 be of lightweight material, such as plastic, to reduce the inertia of said gear train.

Spiral spring 90 is wound by manually rotating shaft 120, which shaft is connected to the inside end of said spiral spring. Furthermore, shaft 120 is journaled at one end in gear train support plate 100 and at a location intermediate its opposite end in circular cover plate 122. Said cover plate is attached to body 10 by conventional fasteners such as screws 128 extending through clearance holes provided in said cover plate and into corresponding tapped holes provided in body 10. The end of spring shaft 120 opposite gear train support plate 100 extends outwardly of body 10 and is threaded to accept internally threaded collar 130 of key 132. A flat, semicircular shaped bow 134 is pivotally attached to collar 130 to pivot about an axis perpendicular to the length of spring shaft 120. Thus, bow 134 can be positioned to extend perpendicularly with respect to cover plate 122 so that said bow can be easily grasped when winding spiral spring 90; then, bow 134 can be pivoted to lie adjacent cover plate 122 so that said bow does not interfere with the operator when spiral spring 90 is unwinding.

For spring motor 22 to operate properly, spiral spring 90 must only be permitted to unwind at its outside end. Thus, ratchet means 136, FIG. 8, is provided to prevent the inside end of spiral spring 90 from unwinding once said spiral spring is wound. Ratchet means 136 includes ratchet gear 138 rotatively fixed to spring shaft 120 between cover plate 122 and spiral spring 90. Consistent with commonly known ratchet means, a dog 140 is biased against the leading edge of the teeth 142 of ratchet gear 138 by spring 144 to prevent said ratchet gear from rotating in a direction to unwind spring 90. Said dog, however, allows said ratchet gear to rotate in the direction for winding said spiral spring.

Now referring specifically to FIG. 3, switch means 146 is provided for controlling the rotation of fan 18. Said switch means is composed of a plunger 148 slidably engageable in plunger bore 150 to permit the bottom end of said plunger to frictionally engage with rim 152 of the fan side plate 72 nearest spring motor 22. A compression spring 154 is connected to the upper end of plunger 148 and to the lower end of actuating lug 156. A knob 158, having a serrated upper edge extending above housing 10 and a lower edge in the shape of a cam is pivotally mounted to body 10 at an elevation above actuating lug 56. When knob 158 is rotated in one direction it forces actuating lugs downward against compression spring 154, which spring in turn pushes against the upper end of plunger 148 to drive said plunger downward against rim 152. When knob 158 is pivoted in the opposite direction, the load imparted against pressure spring 154, and thus plunger 148, is removed, thereby permitting fan 18 to rotate freely.

In operation, with switch means 146 engaged against fan 18, spring motor 22 is energized by manually turning bow 134 of key 132, which bow preferably has been pivoted to a position normal to the plane of cover plate 122. With spring motor 22 thus energized, handle 28 of body 10 can be grasped by the operator's hand for conveniently and accurately pointing nozzle 40 toward an object to be collected, such as an insect. Switch means 146 is then released, causing spiral spring 90 to unwind and thus rapidly rotate fan 18 through gear train 89. Rotating fan 18 draws the air located adjacent to nozzle 11 sequentially through said nozzle, inlet tube 42, diffuser 46, receptacle 26, and internal air passage 32 and then blows such air through air outlet passage 36 and air outlet opening 14. Simultaneously, particles which are in the air are also drawn into body 10, but are prevented from reaching fan 18 by receptacle 26. Flaps 70 of valve 69 deflect under the influence of the indrawn air to permit these particles to pass by. When said receptacle is full, or perhaps when the desired object or insect is collected, knob 158 can be pivoted to the switch engagement position for stopping the rotation of fan 18. Since air is no longer being drawn into body 10, flaps 70 of valve 68 return to their undeflected position to close off receptacle 26 from nozzle 11. To empty receptacle 26, diffuser 46 is simply twisted slightly, disengaging lugs 54 from internal groove 56, to thus disconnect air inlet means 24 from body front end portion 16. Thereupon, receptacle 26 can be conveniently removed from body 10 and then replaced after being emptied. After diffuser 46 is reconnected to body front end portion 20, the apparatus is ready to be used again.

In an alternative embodiment of the present invention, as shown in FIG. 11, nozzle 40 is replaced by a smaller nozzle 159, having a cone shaped tip. This smaller nozzle allows the operator to reach locations which are inaccessible to the larger sized nozzle 40.

In another embodiment of the instant invention the apparatus can be adapted to be used as an air blower device rather than an air suction device. Inlet tube 42, as shown in FIG. 2, is removed from diffuser 46 and replaced by screened nut 38. An outlet tube 160, as shown in FIG. 12, has a threaded rearward end which is connected to outlet opening 14 of body 10 in place of screened nut 38 shown in FIG. 2. A threaded exhaust nozzle 162 is attached to the forward end of outlet tube 160 to direct the air being blown by fan 18. With the exception of not having to empty receptacle 26, the operation of the instant invention as a blower device is the same as its use as an air suction device.

It is to be understood that the above embodiment of this invention is shown and described for purposes of illustration only. Various changes may be made therein without departing from the spirit and scope of the invention.

What is claimed is:

1. A portable, hand held, air suction and blower apparatus, comprising:
 (a) a body having front and rear end portions;
 (b) said body front end portion including a transverse front face having an air inlet opening and a substantially smaller air outlet opening aligned with said air inlet opening;

(c) a tangential fan journaled in said body rear end portion for rotation about an axis generally parallel to said transverse front face, for drawing air into said body through said inlet opening and then forcing such same air forwardly out of said body through said outlet opening;

(d) a manually energized flat spiral spring motor mounted within said body, said motor being geared to said fan for rotating said fan; and (e) a diffuser detachably connectable to said body front end portion for directing air into said body through said inlet opening.

2. The apparatus according to claim 1, further comprising:

a removable, unitary, pervious receptacle receivable by said body through said inlet opening, said receptacle being disposed between said diffuser and said fan, and having an open end portion which is both directed toward said diffuser and surrounded by an integral, outwardly directed flange;

wherein said body front end portion includes an internal shoulder defining an opening sized to closely and slidably receive said receptacle for radially positioning said receptacle in registry with said diffuser, said shoulder having a wall portion facing said inlet opening; and, wherein said diffuser having a rearward end portion engageable within said body inlet opening, said rearward end portion including a rearwardly extending shoulder portion defining the minimum diameter of the diffuser rearward end portion and being the only portion of said diffuser contacting said receptacle, said shoulder portion clamping said receptacle flange between said diffuser and said wall portion of said housing internal shoulder for forming an airtight joint therebetween.

3. A portable, hand held, air suction and blower apparatus, comprising:

(a) a body having front and rear end portions;

(b) said body front end portions including an air inlet opening and a substantially smaller air outlet opening aligned with said air inlet opening;

(c) a tangential fan journaled in said body rear end portion for drawing air into said body through said inlet opening and then forcing such air forwardly out of said body through said outlet opening;

(d) manually energized flat spiral spring motor mounted within said body, said motor being geared to said fan for rotating said fan;

(e) a diffuser detachably connectable to said body front end portion for directing air into said body through said inlet opening; and (f) wherein said spring motor is aligned with and is disposed longitudinally beyond one end of said tangential fan, said spring motor being coaxially surrounded by a cylindrical, rotatable housing, said spring motor housing:

being connected to the exterior end of said spring for being rotated by said spring, and having portions forming an integral internal gear located within the end portion of said spring motor housing adjacent to said fan and of a diameter larger than said spiral spring motor when in an unwound state.

4. The apparatus according to claim 3, wherein said spring motor includes:

a shaft having one end connected to the inside end of said flat spiral spring and having the opposite end extending outwardly of a sidewall of said body; and a key disposed without said housing and pivotally connected to the end of said shaft opposite said spring for rotating said shaft to manually wind said spring, said key having a bow which is adapted to pivot from a spring winding position normal to the side wall of said body for energizing said spring motor to a position parallel the side wall of said body to be within the outer surface of said body sidewall.

5. The apparatus according to claim 3, further comprising switch means for controlling the rotation of said fan, said switch means being frictionally engageable with the outer perimeter of said fan to prevent rotation of said fan.

* * * * *